(12) United States Patent
Vaughn et al.

(10) Patent No.: US 8,297,716 B2
(45) Date of Patent: Oct. 30, 2012

(54) CONTROL SYSTEM FOR AUTOMATIC RELEASE HAND BRAKE

(75) Inventors: Laurence E. Vaughn, Watertown, NY (US); Steven R. Newton, Adams, NY (US); Derick Call, Evans Mills, NY (US)

(73) Assignee: New York Air Brake Corporation, Watertown, NY (US)

( * ) Notice: Subject to any disclaimer, the term of this patent is extended or adjusted under 35 U.S.C. 154(b) by 386 days.

(21) Appl. No.: 12/501,626

(22) Filed: Jul. 13, 2009

(65) Prior Publication Data

US 2011/0006595 A1     Jan. 13, 2011

(51) Int. Cl.
*B60T 15/16* (2006.01)

(52) U.S. Cl. .......... 303/13; 303/3; 303/7; 303/8; 303/15

(58) Field of Classification Search .................. 303/3, 7, 303/8, 13, 15
See application file for complete search history.

(56) References Cited

U.S. PATENT DOCUMENTS

| | | | |
|---|---|---|---|
| 2,804,353 A * | 8/1957 | Bush | ........................ 303/122.15 |
| 4,069,836 A | 1/1978 | Sowinski | |
| 4,099,702 A | 7/1978 | Temple | |
| 4,232,709 A | 11/1980 | Zoric | |
| 5,738,416 A | 4/1998 | Kanjo et al. | |
| 6,175,784 B1 | 1/2001 | Jicha et al. | |
| 6,179,093 B1 | 1/2001 | Daugherty, Jr. | |
| 6,378,668 B1 | 4/2002 | Zemyan et al. | |
| 6,394,559 B1 | 5/2002 | Ring et al. | |
| 6,709,068 B2 | 3/2004 | Herron | |
| 6,789,855 B2 | 9/2004 | Herron | |
| 6,848,754 B2 | 2/2005 | Ring et al. | |
| 6,902,042 B2 | 6/2005 | Ring et al. | |
| 7,014,275 B2 | 3/2006 | Ring | |
| 7,073,753 B2 | 7/2006 | Root et al. | |
| 7,140,477 B2 | 11/2006 | Engle et al. | |
| 7,731,303 B1 | 6/2010 | Ring et al. | |
| 2002/0017439 A1* | 2/2002 | Hill et al. | ........................ 188/107 |
| 2005/0279184 A1 | 12/2005 | Sommerfeld et al. | |

FOREIGN PATENT DOCUMENTS

EP    1193155 A1 *  4/2002

* cited by examiner

*Primary Examiner* — Bradley King
*Assistant Examiner* — Mahbubur Rashid
(74) *Attorney, Agent, or Firm* — Barnes & Thornburg LLP

(57) ABSTRACT

A hand brake control system for a rail vehicle hand brake having a release trigger. The system includes a cylinder for activating the release trigger of the hand brake and a source of pressure. A first valve selectively connects either the source of pressure at a first input or a second input to the cylinder at an output. A second valve selectively connects either the source of pressure or exhaust to the second input of the first valve at the output of the second valve. The first valve is a manually operated valve and the second valve is an electro-pneumatic valve. Linkage allows actuation of the first valve from at least two location about the vehicle.

14 Claims, 1 Drawing Sheet

CONTROL SYSTEM FOR AUTOMATIC RELEASE HAND BRAKE

BACKGROUND AND SUMMARY

The present disclosure relates generally to automatic hand brakes and more specifically to a control system for automatic release of hand brakes.

Hand or parking brakes on rail vehicles generally include a chain connected to the vehicle brakes and wound around a wheel. The brakes are applied by rotating the wheel and tensioning the chain. The hand brake includes a trigger or lever which, when activated, automatically releases the tension on the chain and releases the parking hand brake.

Two cylinders may be provided on the hand brake to apply the brakes by turning the wheel to tension the chain and a second cylinder to release the brakes by interacting with the release trigger or lever. A pneumatic system to control the two cylinders manually is illustrated in U.S. Pat. No. 6,394,559, for example. The use of parallel manually actuated valves and electro-pneumatic valves is described in U.S. Pat. No. 7,014,275. The actuation of the electro-pneumatic valves as discussed herein may be by an electrically controlled pneumatic (ECP) brake network and through the cars control unit (CCU). The overall control system is described, for example, in U.S. Pat. No. 7,073,753.

Remote control of the hand brake by hand-held terminal is described in U.S. Pat. No. 6,175,784.

The present hand brake control system for a rail vehicle hand brake having a release trigger includes a cylinder for activating the release trigger of the hand brake and a source of pressure. A first valve includes first, second, and third ports, and selectively connects either the source of pressure to the cylinder through the first and third ports of the first valve or the cylinder to exhaust through the second and third ports of the first valve. A second valve includes first, second, and third ports, and selectively connects either the source of pressure or exhaust to the second port of the first valve through the third port of the second valve. The first valve may be a manually operated valve and the second valve may be an electro-pneumatic valve.

The first valve is a manually operated valve having a stable position connecting the second port of the first valve to the third port of the first valve and a manually operated position connecting the first port of the first valve to the third port of the first valve. The first valve has a manually operated rocker mechanism.

Linkage may be connected to the first valve and extends to at least two locations about the vehicle for manual operation of the first valve without mounting the vehicle.

The second valve has a stable position connecting exhaust to the second port of the first valve and an activated position connecting the source of pressure to the second port of the first valve.

The source of pressure may be a reservoir on the vehicle or a source of pressure off the vehicle connected by a tap. A check valve between the source of pressure and the first and second valves pre-charges the connection to the first and second valves.

Other objects, advantages and novel features of the present invention will become apparent from the following detailed description of the invention when considered in conjunction with the accompanying drawings.

DETAILED DESCRIPTION OF THE PREFERRED EMBODIMENTS

Figures 1, 2:
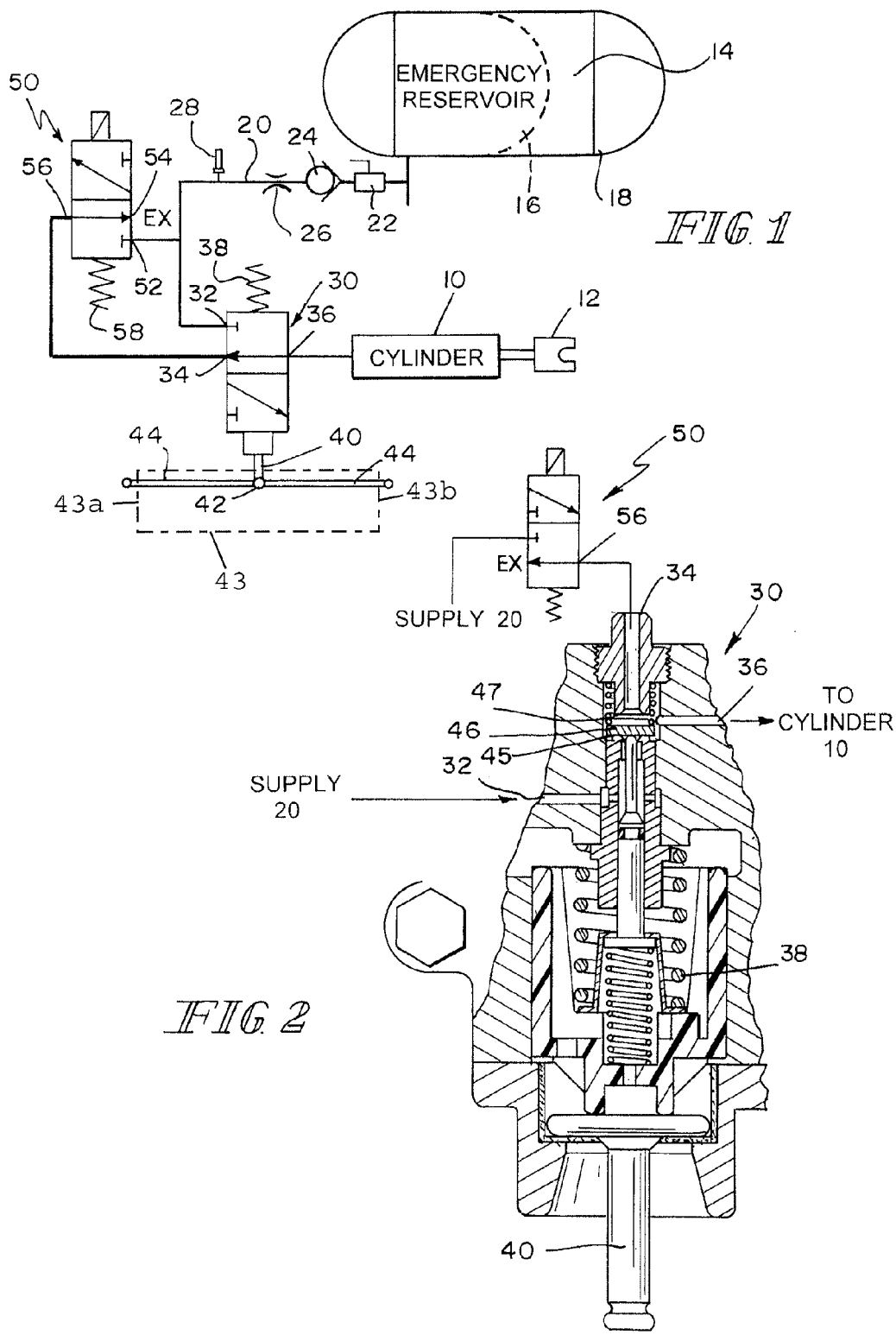
FIG. 1 is a schematic of a hand brake control system for a rail vehicle hand brake according to the present disclosure.
FIG. 2 cross-sectional view of a manual valve for use in the present system.

A control system for automatic release of a hand brake is illustrated in FIG. 1. A pneumatic cylinder 10 via a clevis 12, or a similar mechanism, like a pushrod with a ball-end, and a corresponding socket geometry on the release lever, is connected to the trigger or the release lever of the hand brake on a vehicle. A first source of pressure is shown as a reservoir 14. The reservoir 14 includes an emergency reservoir portion 16 and an auxiliary reservoir portion 18. Such structure is generally available on the vehicle. Even though it is shown as a two compartment reservoir, any other reservoir may be used. This is just an example of a reservoir. The reservoir portion 16 is connected to line 20 by a cutout cock 22, a one way check valve 24 and a choke or orifice 26. A port 28 or quick disconnect fitting is also provided to allow an external source of pressure not on the vehicle to be connected to line 20. This may be, for example, from a way-side air supply and offers an alternative to the emergency reservoir if the emergency reservoir does not have sufficient pressure to operate the system.

The source of pressure in line 20 is connected to a first port 32 of a first valve 30. The first valve 30 is illustrated as a manually operated valve. A second port 34, normally connected to exhaust or atmosphere is provided on the first valve 30. A third port 36 of the first valve 30 is connected to the cylinder 10. Spring 38 biases the first valve 30 in the shown position where the supply pressure at the first port 32 is not connected to the brake release cylinder. In this position, the release cylinder 10 is exhausted through the second port 34. This is a stable position of the first valve 30.

The manual operator 40 of the first valve 30 is connected at joint 42 to links 44. Links 44 extend to the exterior of the vehicle 43 (shown diagrammatically as a dashed box in FIG. 1) allowing access at various points for manual operation at various points adjacent to the vehicle without mounting the vehicle. As shown in FIG. 2, the first valve's 30 manual actuating mechanism 40 may be a rocker type mechanical lifter that can be actuated from any 360 degrees about its center. The rocker mechanism also provides for automatic reset of the first valve 30 when the mechanical actuator is returned to its neutral position.

A second valve 50 is illustrated as an electro-pneumatic valve having first, second, and third ports. The first port 52 is connected to the pressurized supply line 20. The second port 54 is connected to exhaust or atmosphere. The third port 56 is connected to the second port 34 of the first valve 30. Spring 58 biases the second valve 50 in the position shown, wherein the connection to the first port 52 is terminated and exhaust at the second port 54 is connected to the third port 56 of the second valve and the second port 34 of the first valve 30. Thus, in the stable position shown of the two valves 30 and 50, the release cylinder 10 is deactivated. By connecting the second valve 50 between the exhaust EX and the second port 34 of the first valve 30, any system leaking is allowed to go to exhaust. This prevents undesired release of the hand brake.

For manual actuation using the link or release rod 44 and actuator 40, the valve 30 is moved to its applied position connecting the pressurized supply at input 32 to its output 36 and cylinder 10. This activates cylinder 10, activating the release trigger and releasing the hand brake. Once the operator releases the linkage 44, the spring 38 causes the valve 30 to move to its stable position, cutting off the supply of air to the cylinder 10 and connecting the cylinder 10 through valves 30 and 50 to exhaust.

The electro-pneumatic valve 50 may be actuated by an electric signal from its stable position shown to a second position. This connects the pressurized supply at input 52 to its output 56. This is provided directly through input 34 to output 36 of valve 30. This activates the cylinder 10 which moves the brake release trigger or lever. Upon removal of the signal, spring 58 moves the valve 50 back to the position shown, connecting the cylinder 10 via valve 30 and 50 to exhaust and input 54 of valve 50.

The valve 50 may be connected to an ECP car control device CCD which is connected to a train line and activated upon receiving a hand brake release signal from the locomotive. Providing such system is described in U.S. Pat. No. 7,073,753 and is incorporated herein by reference. Alternatively, the valve 50 may be actuated by a hand held device carried by operator as he walks the train. Such a device is shown, for example, in U.S. Pat. No. 6,175,784.

An example of the manually operated valve 30 is shown in detail in FIG. 2. The operator 40 is in a rocker mechanism held in its position down by spring 38. Upon movement in any 360 degree radial direction, it raises pushing valve element 46 off valve seat 45 and onto the valve seat 47. This connects the pressurized supply at first port 32 to the cylinder 10 through the third port 36. In its stable position shown, the valve element 46 sits on valve seat 45 closing off the connection between supply at the first port 32 and the third port 36. The third port 36 is connected to the second port 34 which is connected to valve 50 through open valve seat 47. The structure shown is, for example, similar to the release valve available on the brake control valve DBD60 available from New York Air Brake Corporation. This part is similar to the release valve DB 10A.

Although valve 30 shown in FIG. 2 is just an example of a manually operated valve, other valves may be used, which automatically resets to a stable position upon removing the force applied manually. By using the specific valve shown which is operable from multiple positions along the vehicle, only one valve 30 need be used for operation from both sides of the vehicle.

Releasing the hand brake by means of the present system has clear advantage over current means. The hand brake is generally located at one end of a freight car. It is installed off-center of the car axis and is accessed by a short ladder, so the operator of the handbrake stands on the ladder attached to the car. In this way, if the car or train moves suddenly, the operator moves with the car. Standing on the ground between the cars is clearly unsafe. Although other arrangements address the safety issue of working between the cars, it does not address the safety issues related to climbing a ladder on the end of the car and operating the handbrake while on the ladder. In addition, due to the non car-axial installation location of the handbrake on the car, the hand brake can only be accessed from one side of the car. As cars can be oriented in either direction in a train, releasing all the handbrakes on a train requires that a crew walk both sides of the train.

The present system addresses both limitations of current technology. The release rod, 44, can be actuated from either side 43a, 43b of the car 43, while standing on the ground. By this means the operator avoids both the hazards associated with being position between the cars, and the hazard associated with climbing and working while on the access ladder. In addition, productivity is improved, as all the handbrakes on the train can be accessed from one side of the train, regardless of car orientation. The manually operated valve 30 with the release rod 44 may be used without the second valve 50.

Although the present hand brake control system has been described and illustrated in detail, it is to be clearly understood that the same is by way of illustration and example only, and is not to be taken by way of limitation. The scope of the present invention is to be limited only by the terms of the appended claims.

What is claimed:

1. A hand brake control system for a rail vehicle with a hand brake having a release trigger, wherein the vehicle includes a pair of opposite sides, the system comprising:
    a cylinder that activates the release trigger of the hand brake;
    a source of pressure;
    a first valve having a first port which is a valve input, a second port which is a valve input, and a third port which is a valve output, the first valve selectively connecting the cylinder to the source of pressure through the first and third ports of the first valve or connecting the cylinder to exhaust through the second and third ports of the first valve; and
    a second valve having a first port which is a valve input, a second port which is a valve input, and a third port which is a valve input, the second valve selectively connecting either the source of pressure or exhaust to the second port of the first valve,
    wherein the third port of the second valve is connected to the second port of the first valve thereby selectively connecting the cylinder to exhaust through the second and third ports of the first valve and selectively connecting the cylinder to the source of pressure through the second and third ports of the first valve.

2. The system according to claim 1, wherein the first valve is a manually operated valve and the second valve is an electro-pneumatic valve.

3. The system according to claim 1, wherein the first valve is a manually operated valve having a stable position connecting the second port of the first valve to the third port of the first valve and a manually operated position connecting the first port of the first valve to the third port of the first valve.

4. The system according to claim 3, wherein the first valve has a manually operated rocker mechanism.

5. The system according to claim 3, wherein the second valve has a stable position connecting the second port of the first valve to exhaust and an activated position connecting the source of pressure to the second port of the first valve.

6. The system according to claim 3, including linkage connected to the first valve and extending to at least two locations about the opposite sides of the vehicle for manual operation of the first valve without mounting the vehicle.

7. The system according to claim 1, wherein the second valve has a stable position connecting the second port of the first valve to exhaust and an activated position connecting the source of pressure to the second port of the first valve.

8. The system according to claim 7, wherein the second valve is an electro-pneumatic valve.

9. The system according to claim 1, wherein the source of pressure is a reservoir on the vehicle.

10. The system according to claim 9, including a tap connected another source of pressure off the vehicle.

11. The system according to claim 1, including a check valve between the source of pressure and the first and second valves to pre-charge the connection to the first and second valves.

12. A hand brake control system for a rail vehicle hand brake having a release trigger, wherein the vehicle includes a pair of opposite sides, the system comprising:

a cylinder that activates the release trigger of the hand brake;

a source of pressure;

a manually operated first valve having a first port which is a valve input, a second port which is a valve input, and a third port which is a valve output, the first valve having a stable position connecting the cylinder to exhaust through the second and third ports of the valve and a manual operated position connecting the source of pressure to the cylinder through the first and third ports of the first valve; and linkage connected to the first valve and extending to at least two locations about the opposite sides of the vehicle for manual operation of the first valve from positions off the vehicle, wherein the second port of the first valve selectively connects the cylinder to exhaust through the second and third ports of the first valve and selectively connects the cylinder to the source of pressure through the second and third ports of the first valve via a port of a second valve.

13. The system according to claim 12, wherein the locations are on the opposite sides of the vehicle.

14. The system according to claim 12, wherein the valve has a manually operated rocker mechanism.

* * * * *